Aug. 18, 1931.   L. B. SPERRY   1,819,694
GASKET
Filed Oct. 11, 1926
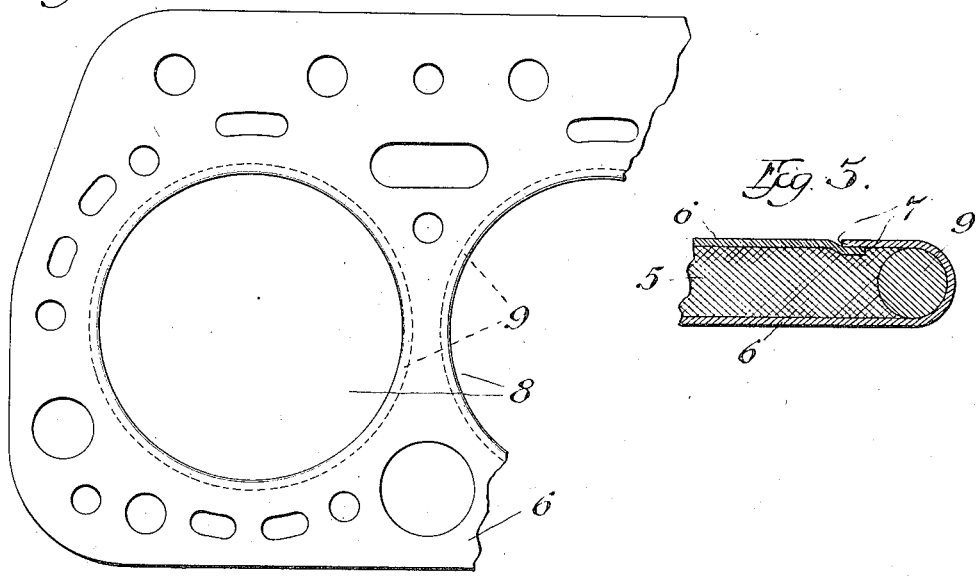
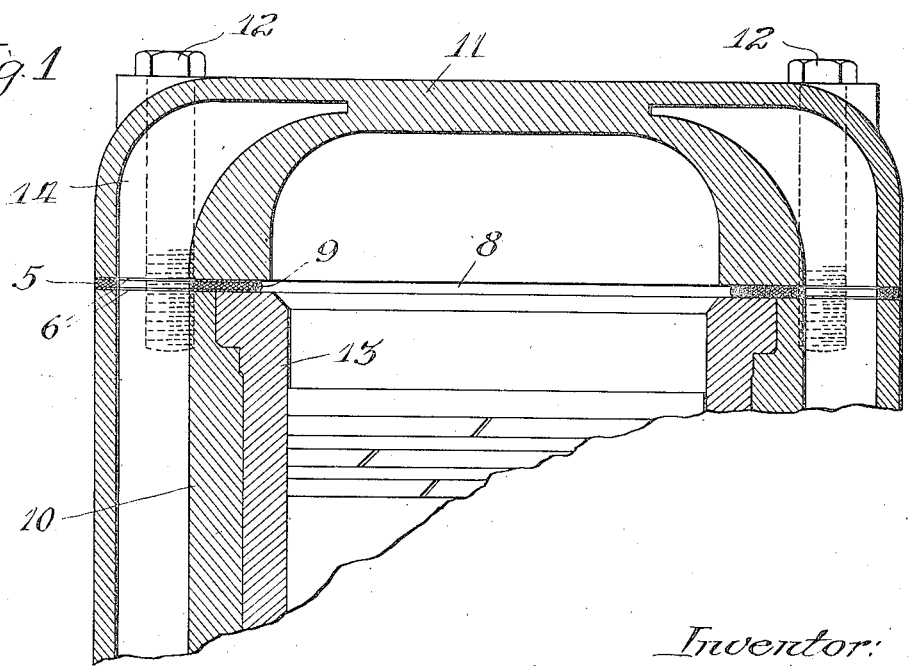
Inventor:
Leonard B. Sperry
By
Atty.

Patented Aug. 18, 1931

1,819,694

UNITED STATES PATENT OFFICE

LEONARD B. SPERRY, OF WESTERN SPRINGS, ILLINOIS, ASSIGNOR TO INTERNATIONAL HARVESTER COMPANY, A CORPORATION OF NEW JERSEY

GASKET

Application filed October 11, 1926. Serial No. 140,709.

This invention relates to the construction of gaskets adapted for general use, but specifically for use in internal combustion engines where the gasket is subjected and exposed to excessive heat or contact with oil, water, or other liquid, or for a sealing joint which is required to hold pressure.

The objects of the invention are generally to improve the construction of metal, and particularly copper sheathed asbestos, gaskets to the end that they will have a longer period of usefulness; to provide a gasket having an improved fire joint which will act to transfer heat from the burning charge in an engine cylinder to the water cooled surfaces of the engine, and lastly to prevent exposure of the asbestos filler to the flame in case the metal edge should burn away.

These very desirable objects are accomplished briefly in a copper or metal sheathed asbestos gasket by providing the fire joints of such gaskets with a soft metallic wire insert built into the gasket by closing the fire joint edge closely therearound.

The invention has been illustrated in the accompanying sheet of drawings wherein Figure 1 is a sectional view vertically through the head of an internal combustion engine showing the improved gasket in use;

Figure 2 is a plan view of the improved gasket; and

Figure 3 is a detail sectional view of part of the gasket on an enlarged scale.

Conventional gaskets comprise an asbestos filler, sheathed in copper with the fire joint edge spun closed. In time this spun edge burns away exposing the asbestos which destroys the pressure seal. Likewise such conventional gaskets are poor heat transfer agents in dissipating heat from the cylinders. Such gaskets must frequently be replaced.

With the improved gasket of this invention these difficulties are effectually overcome by providing a gasket having an asbestos filler 5, sheathed in copper sheaths 6 whose edges surrounding the cylinder openings 8 are brought together in overlapped relation at 7 and spun closed. Before closing the fire joints of the gasket, there is inserted into the gasket adjacent the periphery of the cylinder openings a soft metallic wire ring 9, which in practice may be copper. This wire lies immediately under the sheath 6 which is preferably folded over it in the manner shown by Figure 3.

In use this improved gasket is inserted between the body 10 of an engine and the head 11 thereof as will be understood. Bolts 12 clamp these parts together compressing the gasket so that it will form an effective seal, with the edge containing the soft wire 9 exposed to the heat and fire from the cylinder 13. A cooling water jacket 14 is also illustrated.

It can now be seen that a fire edge of substantial thickness is provided by the wire insert 9, which will not rapidly burn away and expose the asbestos to the fire and heat of the engine cylinder. Should the fire edge burn away the wire insert 9 will act as a barrier to protect the asbestos filler. Similarly the thickened metallic edge will function to transfer the cylinder's heat to the walls 10 and 11 of the engine, which walls are subjected to the cooling action of the water jacket 14 and thus cooling of the engine is aided.

It can now be seen that all of the desirable objects of this invention are accomplished in the above described construction, simply and efficiently, and at a minimum of expense.

What I claim as new is:

1. A cylinder head gasket for an internal combustion engine, said gasket comprising a packing, metallic sheathing enclosing the packing, said gasket having a cylinder opening, a wire ring lying within the sheathing and encircling the cylinder opening, the sheathing being laid around the ring in contact therewith whereby the wire and sheathing form a wide and solid metallic edge as thick as the gasket for protecting the inner packing where exposed to the fire.

2. A cylinder head gasket for an internal combustion engine, said gasket comprising a packing, metallic sheathing enclosing the packing, said gasket having a cylinder opening, a soft wire ring lying within the sheathing and encircling the cylinder opening, the sheathing being laid around the ring in contact therewith whereby the wire and sheathing form a wide and compressible metallic edge as thick as the gasket for protecting the inner packing where exposed to the fire.

In testimony whereof I affix my signature.

LEONARD B. SPERRY.